United States Patent [19]
Weingart

[11] Patent Number: 5,655,090
[45] Date of Patent: Aug. 5, 1997

[54] EXTERNALLY CONTROLLED DSP WITH INPUT/OUTPUT FIFOS OPERATING ASYNCHRONOUSLY AND INDEPENDENTLY OF A SYSTEM ENVIRONMENT

[75] Inventor: Steve Harris Weingart, Boca Raton, Fla.

[73] Assignee: International Business Machines Corporation, Armonk, N.Y.

[21] Appl. No.: 469,614

[22] Filed: Jun. 6, 1995

Related U.S. Application Data

[63] Continuation of Ser. No. 850,544, Mar. 13, 1992.

[51] Int. Cl.$^6$ .................................................. G06F 13/00
[52] U.S. Cl. ............................................... 395/800.25
[58] Field of Search .................... 395/200.02, 200.13, 395/200.2, 250, 872, 877, 880

[56] References Cited

U.S. PATENT DOCUMENTS

| | | | |
|---|---|---|---|
| 3,953,838 | 4/1976 | Gilberg et al. | 365/78 |
| 4,058,773 | 11/1977 | Clark et al. | 377/66 |
| 4,285,038 | 8/1981 | Suzuki et al. | 395/877 |
| 4,295,125 | 10/1981 | Langdon, Jr. | 341/50 |
| 4,473,880 | 9/1984 | Budde et al. | 395/20 |
| 4,486,854 | 12/1984 | Yum | 395/427 |
| 4,694,426 | 9/1987 | Mason | 365/78 |
| 4,723,274 | 2/1988 | Black | 379/242 |
| 4,727,312 | 2/1988 | Fulks | 371/27 |
| 4,740,891 | 4/1988 | Kirkpatrick | 395/800 |
| 4,837,740 | 6/1989 | Sutherland | 395/310 |
| 4,860,244 | 8/1989 | Bruckert et al. | 395/250 |
| 4,965,721 | 10/1990 | Holtey et al. | 395/200.1 |
| 4,984,192 | 1/1991 | Flynn | 395/800 |
| 5,117,486 | 5/1992 | Clark et al. | 395/250 |
| 5,199,105 | 3/1993 | Michael | 395/842 |
| 5,210,749 | 5/1993 | Firoozmand | 370/85.1 |
| 5,241,630 | 8/1993 | Lattin, Jr. et al. | 395/287 |
| 5,262,996 | 11/1993 | Shiue | 365/221 |
| 5,280,597 | 1/1994 | Takata et al. | 395/496 |

FOREIGN PATENT DOCUMENTS

| | | |
|---|---|---|
| 0305527 | 1/1988 | European Pat. Off. . |
| 0282825 | 3/1988 | European Pat. Off. . |
| 9201987 | 2/1992 | WIPO . |

OTHER PUBLICATIONS

IBM Technical Disclosure Bulletin, vol. 23, No. 10, Mar. 1981.
Groesch et al., "Parallel Arithmetic Computation Using A Dedicated Arithmetic Processor," *Proceedings Of The Nat'l Electronics Conference*, vol. 36, 1982, Oak Brook, Illinois, USA, pp. 2090–212.
Jacobs et al, "A Fully Asynchronous Digital Signal Processor Using Self–Timed Circuits", IEEE, vol. 25, No. 6, Dec. 1990.

*Primary Examiner*—Parshotam S. Lall
*Assistant Examiner*—Viet Vu
*Attorney, Agent, or Firm*—Sterne, Kessler, Goldstein & Fox P.L.L.C.; Jay Sbrollini, Esquire

[57] ABSTRACT

A means of making a digital signal processing function perform independently of the system processor and appear as a hardware FIFO. The architecture of the present invention comprises a digital signal processing means connected between the data output of a first FIFO buffer and the data input of a second FIFO buffer, a control means for controlling the digital signal processing means as a function of the presence and absence of data in the first FIFO buffer and said second FIFO buffer and control signals received from a source of control signals. Data throughput is performed asynchronously and independently of the system environment and comprises the following steps: receiving data on the data input of the first FIFO buffer, transferring that data to the digital signal processor, processing the data, then transferring the processed data to the second FIFO buffer to be output when the data receiver is ready to accept to data.

29 Claims, 6 Drawing Sheets

EXTERNALLY CONTROLLED DSP WITH INPUT/OUTPUT FIFOS OPERATING ASYNCHRONOUSLY AND INDEPENDENTLY OF A SYSTEM ENVIRONMENT

This application is a continuation of application Ser. No. 07/850,541, filed Mar. 13,1992.

BACKGROUND OF THE INVENTION

1. Technical Field

This invention relates generally to data flow through a computing system. More specifically, the invention relates to a means of making a digital signal processing function perform independently of the system processor.

2. Related Art

Real-time computational systems dedicate a percentage of processing time to managing data flow through the system and between various subprocessors. The processing time which is dedicated to this function becomes substantial when the computational system has high speed real-time data arriving continuously and asynchronously. Data flow synchronization and throughput speed can also be impeded if the system processor has to handle the data directly.

When these computational systems have processing power which is decentralized and distributed over the processing path, performance is limited by the slowest part of the data path. The high performance of some components or subsystems may be lost due to the low performance of others. In these cases, throughput suffers when the computational results are interdependent, rather than independent among the subprocessors.

These performance problems are compounded when a subsystem function is performed in hardware. These hardware-based functions process data considerably faster that the system processor, resulting in a greater demand being placed on the system processor to manage the data throughput to satisfy the subprocessor's needs.

Computing systems which have high speed real-time data arriving continuously and asynchronously have implemented various techniques to synchronize to the incoming data. For example, interrupts or similar schema are commonly used to respond only when data is available. Utilization of interrupts requires additional hardware to save the full state of the processor, including the indication of the offending event, and the instructions which have to be executed after the interrupt is serviced. This tends to be inefficient, using a significant portion of the processing time to manage the data flow.

Another common solution to handling the asynchronous data flow has been to use First In First Out (FIFO) buffers to synchronize the data input or output to a processor. The FIFO will function as a temporary storage area, holding the incoming data until the processor is ready to receive it, and holding the processed output data until the receiving device is ready to receive it. With the FIFO buffers alone, the performance and speed of the signal processor will continue to have system dependencies due to the system processor having to control the data transfers between other subsystems and the digital signal processor. What is needed is a system architecture which allows sub-processing functions to be performed without the burden of being dependent upon the system environment and relieves the system processor from having to perform the function of controlling the data flow to/from the sub-processor.

DISCLOSURE OF THE INVENTION

The present invention is directed towards a data throughput scheme, and more particularly, to a means of making a digital signal processing function perform independently of the system processor.

The data throughput scheme comprises two first-in-first-out (FIFO) buffers, each having a data input and data output, a digital signal processing means connected between the data output of the first FIFO buffer and the data input of the second FIFO buffer, and a control means for controlling the digital signal processing means as a function of the presence and absence of data in the first and second FIFO buffers.

Both FIFO buffers are comprised of a storage area referred to as a buffer, a buffer full indicator output for indicating a FIFO buffer full condition, a buffer write input for enabling the FIFO buffer to receive input data at data input, a buffer empty indicator output for indicating a FIFO buffer empty condition, and a buffer read input for enabling the FIFO buffer to output data at data output.

The control means comprises an input coupled to the buffer empty indicator output of the first FIFO buffer and an input coupled to the buffer full indicator output of the second FIFO buffer. The control means also comprises an output coupled to the buffer read input of the first FIFO buffer and an output coupled to the buffer write input of the second FIFO buffer. The controlling means controls the output of data from the first FIFO buffer to the digital signal processor and the output of data from the digital signal processor to the second FIFO buffer as a function of control signals received from a source of control signals.

The digital signal processor is comprised of a data input coupled to the data output of the first FIFO buffer and a data output coupled to the data input of the second FIFO buffer. The digital signal processor also has a control signal input coupled to an output of the control means for receiving control signals. The digital signal processor processes data output from the first FIFO buffer as a function of control signals received from the control means.

Data transfer through the system is achieved under the control of the controlling means as a function of control signals received from a source of control signals. Data throughput is performed asynchronously and independently of the system environment and comprises the following steps: receiving data on the data input of the first FIFO buffer, transferring that data to the digital signal processor, processing the data, then transferring the processed data to the second FIFO buffer to be output when the data receiver is ready to accept the data.

FEATURES AND ADVANTAGES

An advantage of the present invention is the capability to perform a digital signal processing function independently of the system processor environment in which it lies. This relieves the system of the data throughput problems typical of systems which contain multiple processing functions.

It is a further advantage of the present invention to reduce the system processor's responsibility for managing data flow. This substantially increases the amount of processing time available for other functions.

It is a further advantage to alleviate any potential synchronization problems between the incoming data transfers, signal processing, and output data transfers.

BEST MODE FOR CARRYING OUT THE INVENTION

The preferred embodiment of the present invention is now described with reference to the figures, where like reference numbers indicate like elements.

In the present invention an architecture is shown which enables a digital signal processing function to operate asynchronously and independently of the system processor, thereby appearing as a hardware FIFO containing an embedded transfer function.

Figure 1:
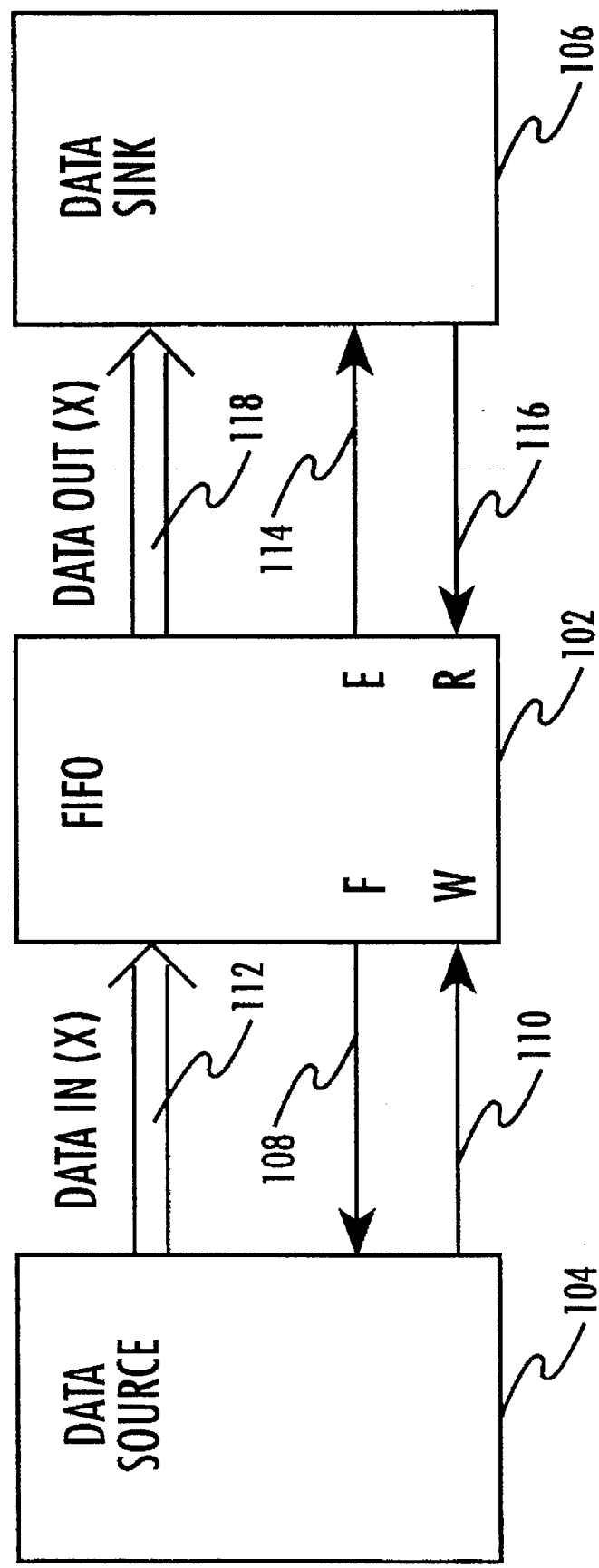
FIG. 1 is a diagram of a typical First In First Out (FIFO) buffer.

A First In First Out (FIFO) buffer is illustrated in FIG. 1. When a data source 104 has data available for a data sink 106, it places the data in a FIFO 102 by presenting the data on a data input line 112 and activating a buffer Write signal on line 110. FIFO 102 then receives and stores the data. When data is available to be output from FIFO 102, the data sink 106 will be notified by the absence of a buffer Empty signal on line 114. Whenever FIFO buffer 102 is not empty, the data sink can transfer data from FIFO buffer 102 by activating the buffer Read signal on line 116. If data sink 106 is unable to remove data at a rate greater or equal to the rate at which data source 104 is outputting it, the FIFO buffer 102 will continue to be filled with data until it is full. When this occurs, data source 104 will be presented with a buffer Full signal on line 108. FIFO buffer architecture is not limited to that shown here. Other configurations include control signals such as a half-full signal, indicating to data sink 106 when the FIFO buffer is 50 percent full.

Figure 2:
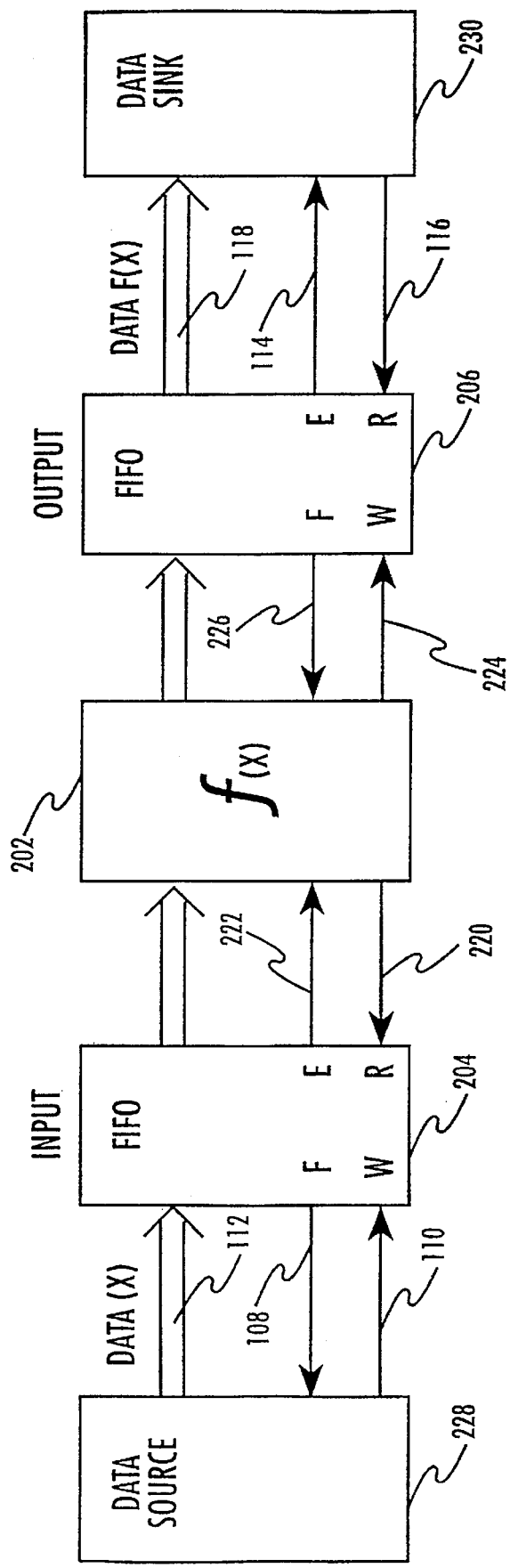
FIG. 2 is a block diagram illustrating the use of FIFO buffers in an asynchronous computing machine.

FIG. 2 illustrates a digital signal processor (DSP) utilizing FIFO buffers to handle data throughput. The digital signal processor 202 receives data from data source 228 through input FIFO buffer 204. It then processes the data and outputs it in modified form for data sink 230 through output FIFO buffer 206. Input and output FIFO buffer 204 and 206 function as described above to synchronize data flow between DSP 202 and other subsystems.

Figure 3:
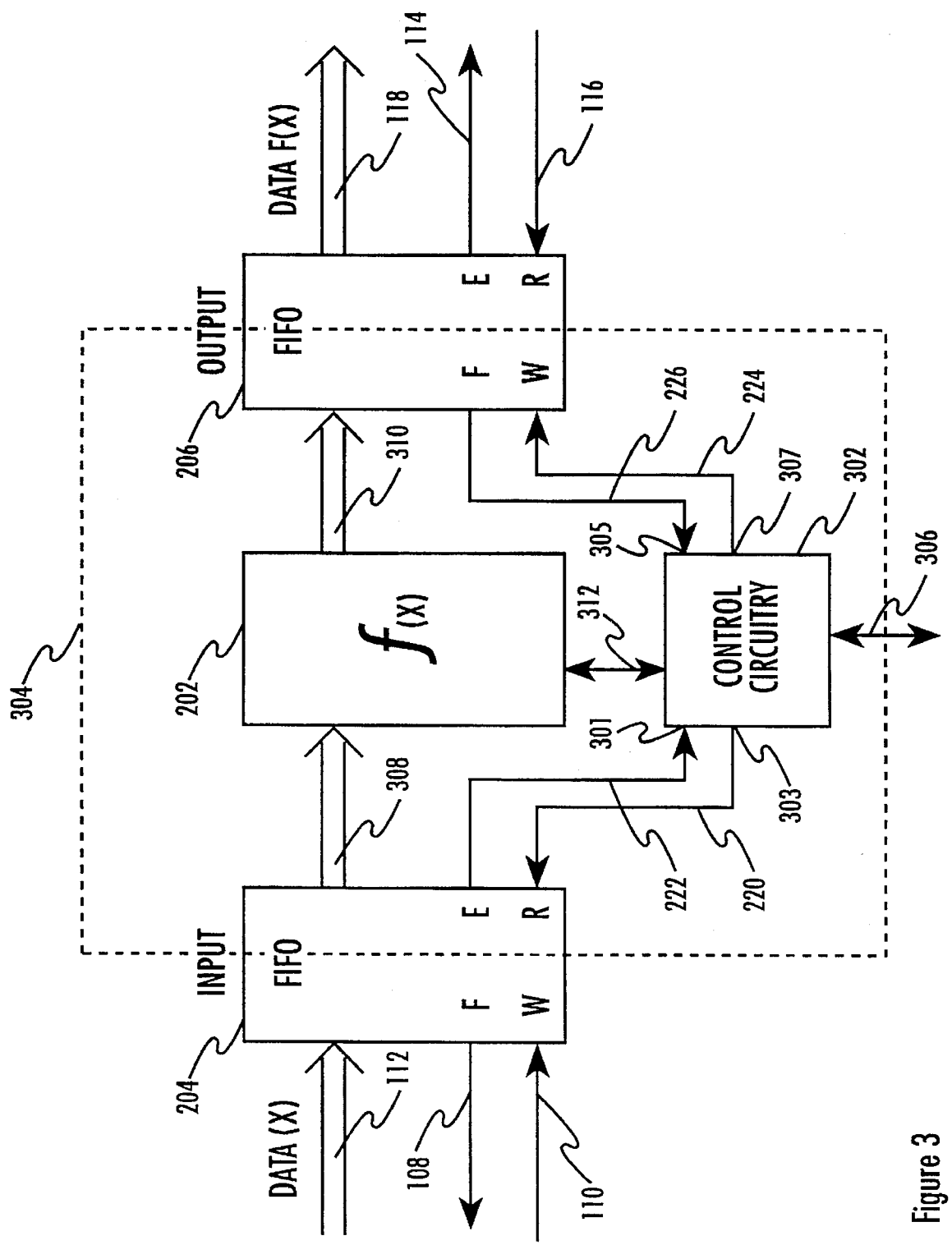
FIG. 3 is a high-level block diagram of the present invention.

A block diagram of the present invention is illustrated in FIG. 3. A control circuit 302 is placed between input FIFO buffer 204 and output FIFO buffer 206 along with the digital signal processor (DSP) 202.

Control circuit 302 is comprised of an input 301 and an output 303 coupled to input FIFO buffer 204. The input 301 is coupled to the buffer Empty output of FIFO buffer 274 by line 222. Input 301 receives the buffer Empty signal from the input FIFO buffer 204. The output 303 is coupled to buffer Read input of FIFO buffer 204 by line 220. Output 303 enables the FIFO buffer 204 to output data on data line 308 to DSP 202.

Control circuit 302 is also comprised of an input 305 and an output 307 coupled to output FIFO buffer 206. The input 305 is coupled to buffer Full output of FIFO buffer 206 by line 226. Input 305 receives the buffer Full signal from the FIFO buffer 206. The control circuit output 307 is coupled to the Write input of FIFO buffer 206 by line 224. Output 307 enables the FIFO buffer 206 to receive data on data line 310 from DSP 202.

Control circuit 302 is also coupled to DSP 202 by line 312 and to a source of control signals by line 306.

Data is input to FIFO buffer 204 on data line 112 from a source of data. The source of data enables the FIFO buffer 204 to receive data by sending a buffer Write signal on line 110. The FIFO buffer 204 then receives the data on data line 112 and notifies control circuit 302 that it has data by removing the buffer Empty signal on line 222. Control circuit 302 determines if data should be sent to DSP 202 over data line 308 as a function of control signals received from a source of control signals and the status of DSP 202. When the DSP is ready to receive the data, control circuit 302 enables the FIFO buffer 204 by sending it a buffer Read signal on line 220. If the FIFO buffer 204 completely fills with data, it will then notify the source of data by sending a buffer Full signal on line 108.

Control circuit 302 controls the output of data from the FIFO buffer 204 to the DSP 202 as a function of the buffer Empty signal received from FIFO 204 on line 222 and the control signals received from a source of control signals on line 306. Control circuit 302 may then control the processing of data by DSP 202 by transmitting and receiving control and status information over line 312. Control circuit 302 then controls the output of data from DSP 202 to the output FIFO buffer 206 as a function of the buffer Full signal received from FIFO 206 on line 226 and the control signals received from a source of control signals on line 306.

When DSP 302 has processed data available for FIFO 206, control circuit 302 enables FIFO 206 to receive the data by sending a buffer Write signal on line 224. The FIFO buffer 206 then receives and stores the processed data. Output FIFO buffer 206 notifies the receiver of data that data is available by removing the buffer Empty signal on line 114. When the receiver of data is ready to receive the processed data, it enables the output FIFO buffer 206 by sending it a buffer Read signal on line 116. The FIFO buffer 206 then outputs the processed data on data line 118. If the output FIFO buffer 206 completely fills with data, then it will notify control circuit 302 by sending a buffer Full signal on line 226.

Control circuit 302 transmits and receives data with a source of control signals on line 306. Minimally, the only control function that control circuit 302 may require is a control signal indicating when a system reset is to occur. More typically, however, control signals to control circuit 302 include initialization and enabling signals as well. Once control circuit 302 has been enabled, it will control the functioning of DSP 302 without requiring further communication with the source of control signals.

This asynchronous operation allows the digital signal processing function to process data at its maximum rate until either there is no data remaining in FIFO buffer 204 or there is no room in output FIFO buffer 206 to store the processed data.

The control circuit 302 can take any form necessary to manage the data throughput. In the preferred embodiment, control circuit 302 is of the form of a finite state machine. However, it will be understood by those skilled in the art that the controlling means can take on various forms without departing from the spirit and scope of the invention.

Figure 4:
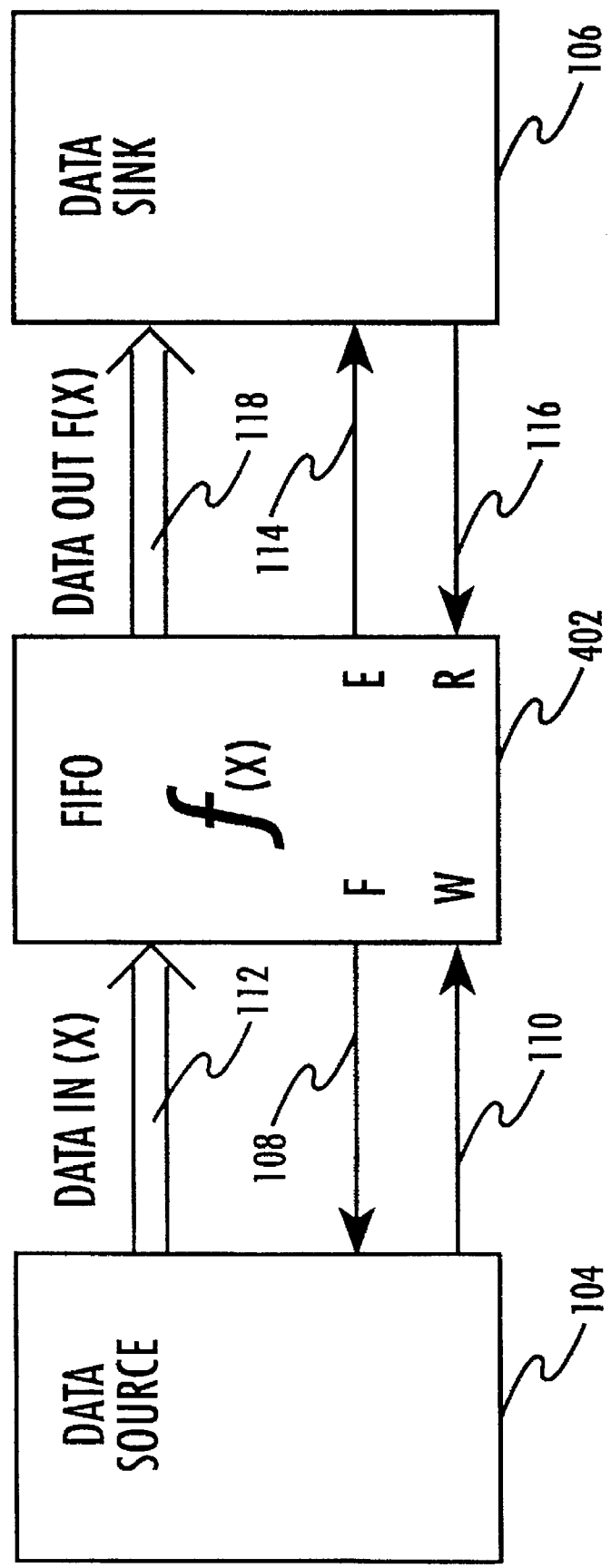
FIG. 4 is a block diagram of a FIFO with an embedded processing function.

Those elements of the present invention which are transparent to the system environment are included in the area bounded by dashed line 304. This includes DSP 202, control circuit 302, the output side of input FIFO buffer 204 and the input side of output FIFO buffer 206. These elements are transparent in that there is no direct access to them from the system environment. The functions, therefore, appear as a single FIFO buffer with an embedded digital signal processor as illustrated in FIG. 4. FIFO buffer 402 interfaces with data source 104. This interface includes data input line 112 and the buffer Full and buffer Write control lines 108 and 110, respectively. The FIFO buffer 402 interface with data sink 106 includes data output line 118 and buffer Empty and buffer Write control lines, 114 and 116, respectively. This is identical in function and appearance to the interfaces shown in FIG. 3. From the system standpoint, the signal processing function in compressed into a single FIFO function.

It will be understood by those skilled in the art that the digital signal processing means can take on various forms without departing from the spirit and scope of the invention. Many applications which have the common problem of managing a continuous stream of real-time data can benefit from the present invention. Examples of these applications are audio and video signal processing, data compression, data encoding and decoding, data translation or substitution, and instrumentation and sensing signal processing.

Figure 5:
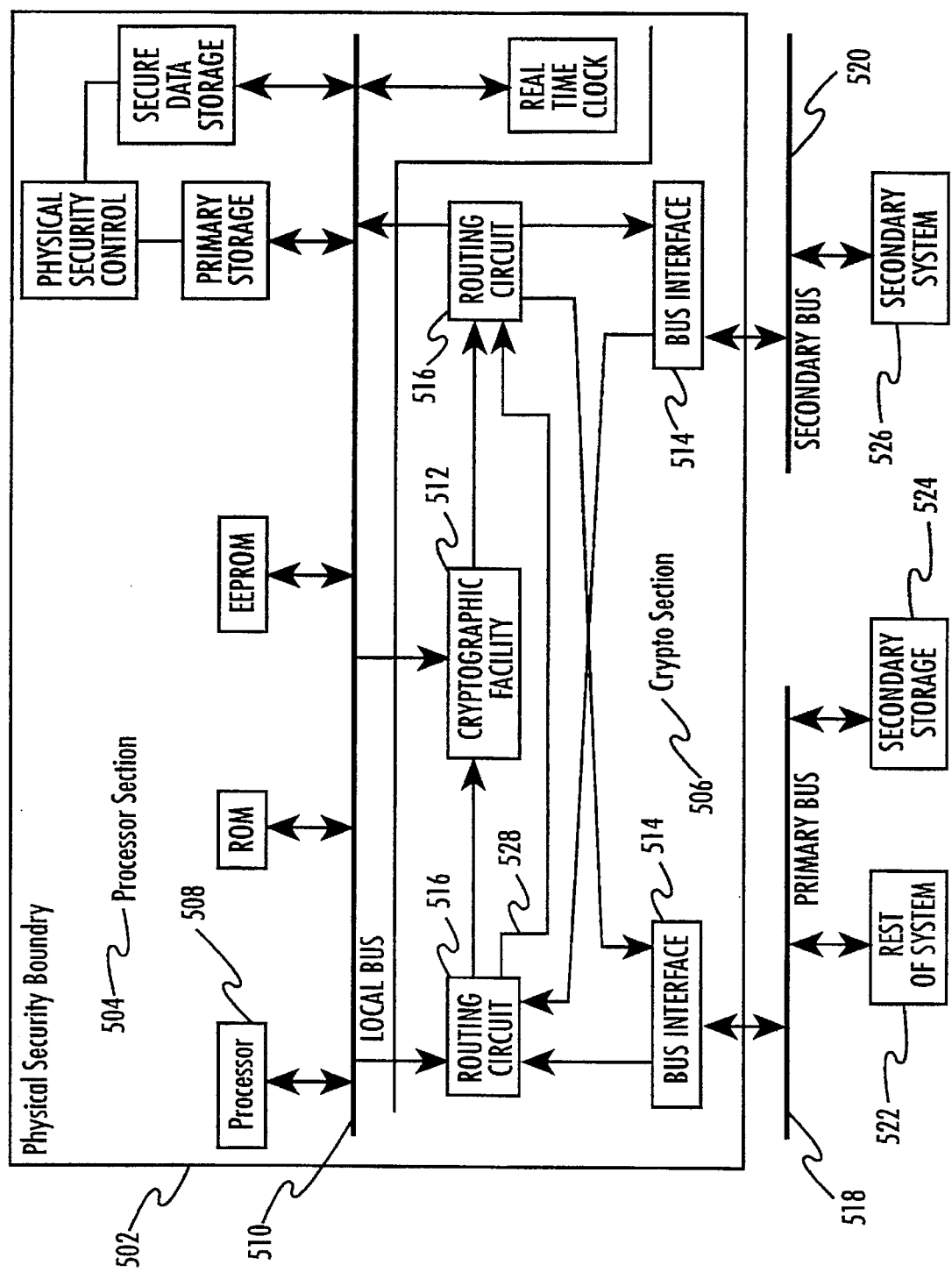
FIG. 5 is a high-level block diagram of a Citadel 386SX co-processor.

An example of the present invention utilized in a cryptographic system is shown in FIG. 5. The cryptographic secure processor is a co-processor which performs cryptographic functions for a host processor. The cryptographic co-processor 502 is functionally separated into two sections: a processor section 504 and crypto section 506. These two sections are combined into a single physically secure package.

The processor section 504 contains the system processor, memory and other associated components. For the present discussion, only processor 508 and local bus 510 are relevant. The processor 508 is an Intel 386SX microprocessor which controls the system environment, including data transfer to/from the crypto section 506. The crypto section 506 contains bus interface components 514, routing circuits 516, and cryptographic facility 512. The cryptographic co-processor 502 interfaces with its environment via primary bus 518 and the secondary bus 520. In FIG. 5, the components with which the cryptographic co-processor 502 interfaces are: a secondary system 526, a secondary storage location 524, and the rest of the system 522. The rest of the system 522 illustrates the larger system environment within which the cryptographic co-processor 502 lies.

Routing circuits 516 are employed to enable cryptographic facility 512 to receive or transmit data over either of the three buses (510, 518, or 520) with which it interfaces, with any buses acting as the data source and data destination. For example, data can be encrypted or decrypted from primary bus 518 to the secondary bus 520, from the primary bus 518 to itself, from the cryptographic local bus 510 to the primary bus 518, etc. The routing circuits 516 are connected to each other via data path 528 to enable data to be passed through the system without being processed by cryptographic facility 512.

Bus interfaces 514 are the communication ports with which the cryptographic co-processor interfaces with the primary bus 518 and secondary bus 520.

Figure 6:
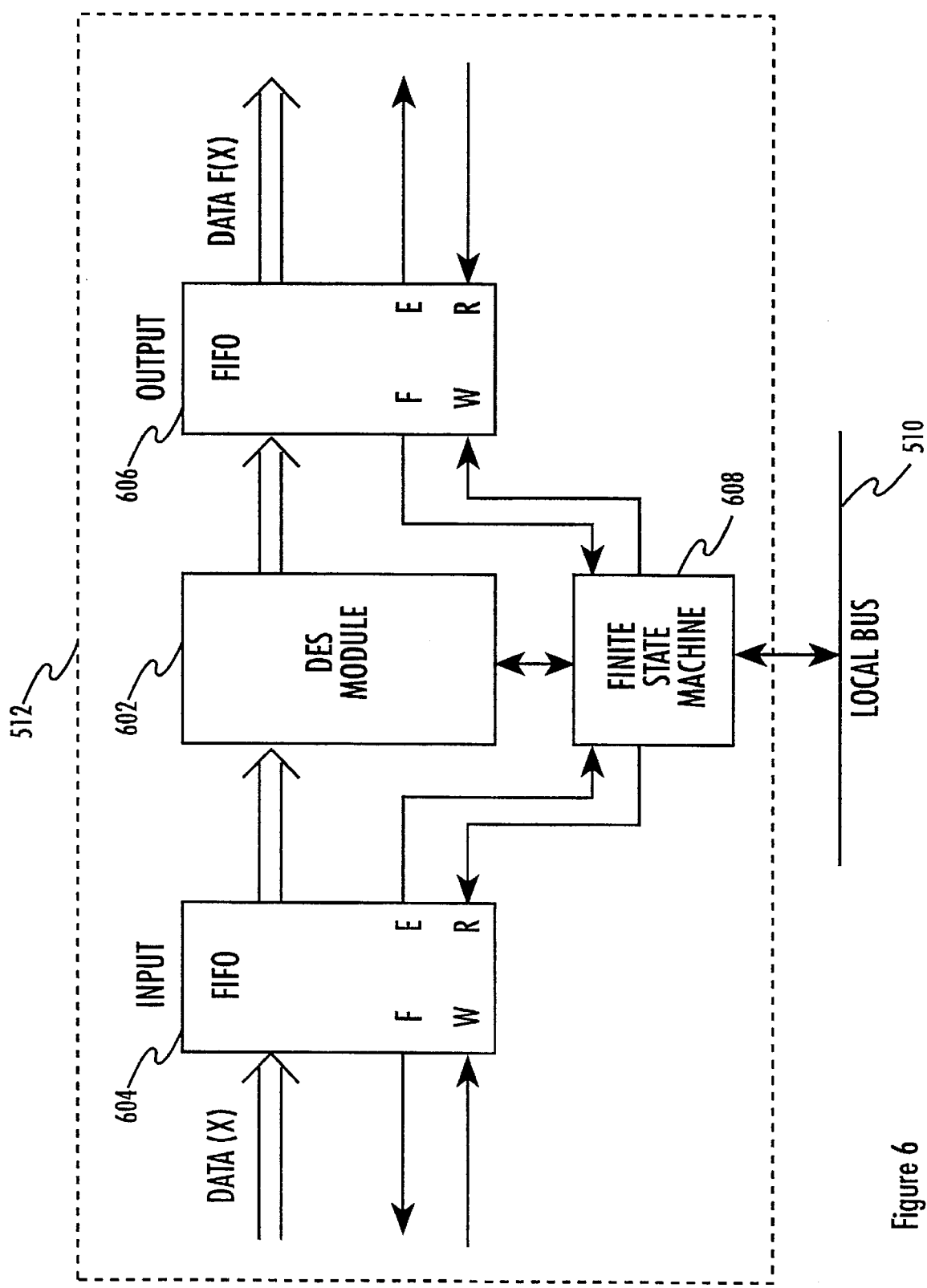
FIG. 6 is a block diagram of the cryptographic facility of the Citadel processor utilizing the architecture of the present invention.

The cryptographic facility 512 utilizes the preferred embodiment of the present invention. FIG. 6 is a block diagram of cryptographic facility 512. Cryptographic facility 512 contains data encryption system (DES) module 602, input FIFO 604, output FIFO 606, and finite state machine 608. DES module 602 performs the data encryption/decryption processing functions of the cryptographic co-processor 502. The input and output FIFOs 604 and 606 perform the same functions as FIFOs 204 and 206 of FIG. 3. Finite state machine 608 performs the control functions for the cryptographic facility 512 performing the same function as control 302 of FIG. 3.

In operation, the processor 508 determines which of the three buses will be the source and which will be the destination for cryptographic facility 512. Once it makes this determination, it initializes the finite state machine 608 with this information, and then enables finite state machine 608 via local bus 510 when it is ready. At that point, cryptography is performed according to the initialization instructions until processing is complete. This configuration allows the cryptographic section 506 to perform its processing and communications functions, independent of processor 508, at maximum speed whenever data is available. As a result, cryptographic facility 512 then appears as a FIFO with an embedded cryptographic function. This function is performed asynchronously and independently, requiring only initialization instructions and an enabling command from processor 508. This removes the burden of managing the data flow from the cryptographic facility 512, allowing processor 508 to dedicate more processing time to other functions.

Although the preferred embodiment of the invention has been illustrated, it will be readily apparent to those skilled in the art that various modification may be made therein without departing from the spirit of the invention or from the scope of the appended claims.

What is claimed is:

1. A computer system for implementing a transfer function comprising:

a processor; and means, coupled to said processor, for implementing a transfer function including:

a first first-in-first-out (FIFO) buffer having a first storage area, a first data input and a first data output, said first input coupled to said processor;

a second FIFO buffer having a second storage area, a second data print and a second data output, said second output coupled to said processor;

digital signal processing means, connected between said first data output of said first FIFO buffer and said second data input of said FIFO buffer, for receiving data from said first FIFO buffer, for modifying said data according to the transfer function, and for outputting said modified data to said second FIFO buffer; and control means, independent of said processor, for controlling said digital signal processing means and for controlling data transfer through said means for implementing as a function of a status of said first FIFO, said second FIFO, and said digital signal processing means, wherein said data transfer includes data transfer from said first FIFO buffer to said digital signal processing means, and data transfer from said digital signal processing means to said second FIFO buffer, and wherein said control means controls said data transfer so that, with respect to said processor, said means for implementing operates as single FIFO with and embedded transfer function.

2. The system of claim 1, wherein said first FIFO buffer further comprises:

a first buffer full output for outputting a first FIFO buffer full condition signal; and a first buffer write input for receiving a write enable signal, said write enable signal enabling said first FIFO buffer to receive data at said first data input.

3. The system of claim 1, wherein said first FIFO buffer further comprises:
- a first buffer empty output for outputting a first FIFO buffer empty condition signal; and
- a first buffer read input for receiving a read enable signal, said read enable signal enabling said first FIFO buffer to output data at said first data output.

4. The system of claim 3, wherein said control means further comprises:
- a first input coupled to said first buffer empty output of said first FIFO buffer; and
- a first coupled to said first buffer read input of said first FIFO buffer, wherein said status of said first FIFO utilized by said control means includes said first FIFO buffer empty signal.

5. The system of claim 4, wherein said digital signal processing means comprises:
- a third data input coupled to said first data output of said first FIFO buffer;
- a third data output coupled to said second data input of said second FIFO buffer;
- an external control input coupled to a function control output of said control means, configured to receive control signals generated by said control means;
- a function status output, coupled to a function status input of said control means, configured to output said status of said digital signal processing means utilized by said control means; and means for processing data received from said first FIFO buffer at said third data input as a function of control signals received from said control means at said function control input.

6. The system of claim 1, wherein said second FIFO buffer further comprises:
- a second buffer empty output for outputting a second FIFO buffer empty condition signal; and
- a second buffer read input for receiving a read enable signal, said read enable signal enabling said second FIFO buffer to output data at said second data output.

7. The system of claim 5, wherein said second FIFO buffer further comprises:
- a second buffer full output for outputting a second FIFO buffer full condition signal; and
- a second buffer write input for receiving a write enable signal, said write enable signal enabling said second FIFO buffer to receive data at said second data input.

8. The system of claim 7, wherein said control means further comprises:
- a second input coupled to said second buffer full output of said second FIFO buffer; and
- a second output coupled to said second buffer write input of said second FIFO buffer, wherein said status of said second FIFO utilized by said control means includes said second FIFO buffer full condition.

9. The system of claim 1, where said control means comprises a finite state machine.

10. The system of claim 1, wherein
- said first FIFO buffer further comprises a buffer empty output for outputting a first FIFO buffer empty condition signal indicating a first FIFO buffer empty condition;
- said second FIFO buffer further comprises a buffer full output for outputting a buffer full condition signal indicating a second FIFO buffer full condition;
- said digital signal processing means further comprises a status indicator output for outputting a function status signal indicating a processing status of said digital signal processing means;
- said control means further includes,
  - a first input coupled to said buffer empty output of said first FIFO buffer,
  - a second input coupled to said buffer full output of said second FIFO buffer, and
  - a third input coupled to said status indicator output of said digital signal processing means, wherein said status utilized by said control means includes said first FIFO buffer empty condition, said second FIFO buffer full condition, and said processing status of said digital signal processing means.

11. The system of claim 1 wherein said digital signal processing means comprises a data encoding and/or decoding means.

12. The system of claim 1, wherein said digital signal processing means comprises an audio and/or video signal processing means.

13. The system of claim 1, wherein said digital signal processing means comprises an instrumentation or sensing signal processing means.

14. The system of claim 1, wherein said digital signal processing means comprises an data translation or substitution means.

15. A method for implementing a transfer function in a computer system having a processor, a first-in-first-out (FIFO) buffer coupled to the processor, a second FIFO buffer coupled to the processor, a digital signal processing means interposed between the first FIFO buffer and the second FIFO buffer, and a control means coupled to the FIFO buffer, the second FIFO buffer, and the digital signal processing means, the method comprising the steps of:

(a) receiving data from the processor at a first data input of the FIFO buffer;

(b) transferring said data from the first FIFO buffer to the digital signal processing means, said data transfer invoked by the control means based upon a status of the first FIFO buffer and the digital signal processing means;

(c) processing, by the digital signal processing means, said data transferred from the first FIFO buffer to the digital signal processing means at said step (b) to convert said data to processed data according to transfer function;

(d) transferring said processed data from the digital signal processing means to the second FIFO buffer, said data transfer invoked by the control means based upon a status of the second FIFO buffer and said status of the digital signal processing means; and (e) outputting said processed data from said second FIFO buffer to the processor, wherein said data transfer of steps (b) and (d) occurs asynchronously and independently of the processor so that, with respect to the processor, the first and second FIFO buffer, the digital signal processing means, and the control means operate as a single FIFO that implements said transfer function.

16. The method of claim 15, wherein said data receiving step (a) further comprises the step of:

(1) outputting, by the first FIFO buffer, a first FIFO buffer empty signal indicating the first FIFO buffer is empty;

(2) inhibiting the output of a first FIFO buffer full signal when the first FIFO buffer in not completely filled with data;

(3) receiving a first FIFO write enable signal at a first buffer write enable input of the first FIFO buffer, wherein said write enable signal enable the first FIFO buffer to input data at said first data input;

(4) receiving data at said first data input of the first FIFO buffer;

(5) storing said data in the first FIFO buffer;

(6) inhibiting the output of said first FIFO buffer empty indication; and (7) outputting said first FIFO buffer full indication when the first FIFO buffer completely fill with said data received at said step (a)(4).

17. The method of claim 15, wherein said data transfer step (b) comprises the steps of:

(1) receiving, by the control means, status information from the digital signal processing means;

(2) receiving, by the control means, said first FIFO buffer empty signal when a first FIFO buffer empty condition exists; and (3) transferring said data from the first FIFO buffer to the digital signal processing means, said control means invoking said transfer of data based upon said first FIFO buffer empty condition and said status of said digital signal processing means, said control means sending a first FIFO buffer read enable signal to the first FIFO buffer, said read enable signal enabling the first FIFO buffer to output data on said first data output.

18. The method of claim 15, wherein said data transferring step (d) comprises the steps of:

(1) inhibiting, by the second FIFO buffer, a second FIFO buffer full signal, said second FIFO buffer full signal indicating a second FIFO buffer full condition;

(2) transferring said processed data from the digital signal processing means to the second FIFO buffer, said transfer of said processed data invoked by the control means based upon said status of said digital signal processing means and said second FIFO buffer full condition; and (3) storing said processed data in said second FIFO buffer.

19. A processing system, comprising:

a data source;

a data sink; and a sub-processing system coupled between said data source and said data sink including:

a first first-in-first-out (FIFO) buffer having a first data input and a first data output, wherein said first data input is coupled to said data source, a second FIFO buffer having a second data input and a second data output, wherein said second data output is coupled so said data sink, a digital signal processing means, connected between said first data output of said first FIFO buffer and said second data input of said second FIFO buffer, for processing digital signals, and control means for controlling data transfer through said sub-processing system as a function of a status of said first FIFO buffer, said second FIFO buffer, and said digital signal processing means, such that said data transfer through said sub-processing system occurs asynchronously and independently of said data source and said data sink so that sub-processing system operates as a single FIFO having an embedded transfer function.

20. A cryptographic co-processor, comprising:

a processor section including a processor and a local bus; and a crypto section, coupled to said processor section, including:

a first routing circuit, a second routing circuit, and a cryptographic facility having:

a first first-in-first-out (FIFO) buffer having a first data input and a first data output, wherein said first data input is coupled to said first routing circuit, a second FIFO buffer having a second data input and a second data output, wherein said second data output is coupled to said second routing circuit, a data encryption system means, connected between said first data output of said first FIFO buffer and said second data input of said second FIFO buffer, for performing data encryption, and control means for controlling data transfer through said cryptographic facility as function of a status of said first FIFO buffer, said second FIFO buffer, and said data encryption system means said data transfer through said cryptographic facility occurs asynchronously and independently of said first routing circuit and said second routing circuit so that, with respect to said processor section, said cryptographic facility operates as a single FIFO that implements said data encryption.

21. The cryptographic co-processor of claim 20, wherein said data encryption system means further performs data decryption.

22. The cryptographic co-processor of claim 20, wherein said data encryption system means comprises a digital signal processor.

23. The cryptographic co-processor of claim 20, wherein said first routing circuit routes data from one of said local bus, a primary external bus, and a secondary external bus to said first data input of said first FIFO buffer.

24. The cryptographic co-processor of claim 20, wherein said second routing circuit routes data from said second output of said second output of said second FIFO buffer to one of said local bus, a primary external bus, and a secondary external bus.

25. The cryptographic co-processor of claim 20, wherein said processor section and said crypto section are combined into a single physically secure package.

26. A computer system for implementing a transfer function the system comprising:

a data source;

a data sink; and a processing system including:

a first first-in-first-out (FIFO) buffer having a first data input and a first data output, wherein said first data input is coupled to said data source, a second FIFO buffer having a second data input and a second data output, wherein said second data output is coupled to said data sink, a digital signal processing means, connected between said first data output of said first FIFO buffer and said second data input of said second FIFO buffer, for receiving data from said first FIFO buffer, for processing said data according to the transfer function, and for outputting said processed data to said second FIFO buffer, control means, independent from said data source and said data sink, for controlling data transfer from said first FIFO buffer to said digital signal processing means, for controlling data transfer from said digital signal processing mean to said second FIFO buffer, and for controlling said processing of said digital signal processing means, such that, with respect to said data source and said data sink, said processing system functions as a single FIFO buffer that implements the transfer function.

27. A computer system comprising:

a processor; and a logical first-in-first-out (FIFO) buffer having an embedded transfer function for operation with an external processor, comprising:
  an input for receiving input data from said processor;
  an output for providing output data to said processor;
  an input memory portion having a first storage area for storing said input data received from said processor;
  an output memory portion having a second storage area for storing said output data to be provided to said processor; and
  digital signal processing means for receiving said input data from said input memory portion, for modifying said input data according to a transfer function, and for storing said modified data to said output memory as said output data;
wherein said processor writes data to said input memory portion via said input and reads data from said output memory portion via said output, and whereby said processor appears to operate with said logical FIFO as a single FIFO.

28. The logical FIFO of claim 27, further comprising:
  control means for controlling said digital signal processing means, for controlling a transfer of said input data from said input memory portion to said digital signal processing means, and for controlling a transfer of said modified data from said digital signal processing means to said output memory portion, wherein said control means is independent of said processor.

29. A computer system for implementing a transfer function, comprising:

a processor including a local bus; and means for implementing a transfer function including:
  a first first-in-first-out (FIFO) buffer having a first data input and a first data output, wherein said first data input is coupled to said processor,
  a second FIFO buffer having a second data input and a second data output, wherein said second data output is coupled to said processor,
  a digital signal processing means, connected between said first data output of said first FIFO buffer and said second data input of said second FIFO buffer, for modifying data from said first FIFO buffer according to the transfer function, and control means for controlling data transfer though said means for implementing as a function of a status of said first FIFO buffer, said second FIFO buffer, and said digital signal processing means, said data transfer occurs asynchronously and independently of said processor so that, with respect to said processor, said means for implementing operates as a single FIFO that implements the transfer function.

* * * * *

UNITED STATES PATENT AND TRADEMARK OFFICE
CERTIFICATE OF CORRECTION

PATENT NO. : 5,655,090

DATED : August 5, 1997

INVENTOR(S) : Weingart

It is certified that error appears in the above-identified patent and that said Letters Patent is hereby corrected as shown below:

At column 6, line 38, "print" should be --input--;

At column 6, line 42, "said FIFO" should be --said second FIFO--;

At column 6, line 59, "and" should be --an--;

At column 7, line 12, "first coupled" should be --first output coupled--;

At column 7, line 58, "where" should be --wherein--;

At column 8, line 16, "claim 1" should be --claim 1,--;

At column 8, line 28, "a first-in" should be --a first first-in--;

At column 8, line 32, "the FIFO" should be --the first FIFO--;

At column 8, line 36, "the FIFO" should be --the first FIFO--;

At column 8, line 46, "according to" should be --according to a--;

At column 8, line 58, "buffer," should be --buffers,--;

At column 8, line 62, "step" should be --steps--; (second occurrence)

At column 8, line 66, "in" should be --is--;

At column 9, line 3, "signal enable" should be --signal enables--;

At column 9, line 11, "fill" should be --fills--;

At column 9, line 51, "so" should be --to--;

UNITED STATES PATENT AND TRADEMARK OFFICE
CERTIFICATE OF CORRECTION

PATENT NO. : 5,655,090
DATED : August 5, 1997
INVENTOR(S) : Weingart

It is certified that error appears in the above-identified patent and that said Letters Patent is hereby corrected as shown below:

At column 10, line 45, "tion the" should be --tion, the--;

At column 10, line 66, "mean" should be --means--; and

At column 12, line 21, "though" should be --through--.

Signed and Sealed this

Thirteenth Day of January, 1998

Attest:

BRUCE LEHMAN

Attesting Officer

Commissioner of Patents and Trademarks